Patented July 26, 1932

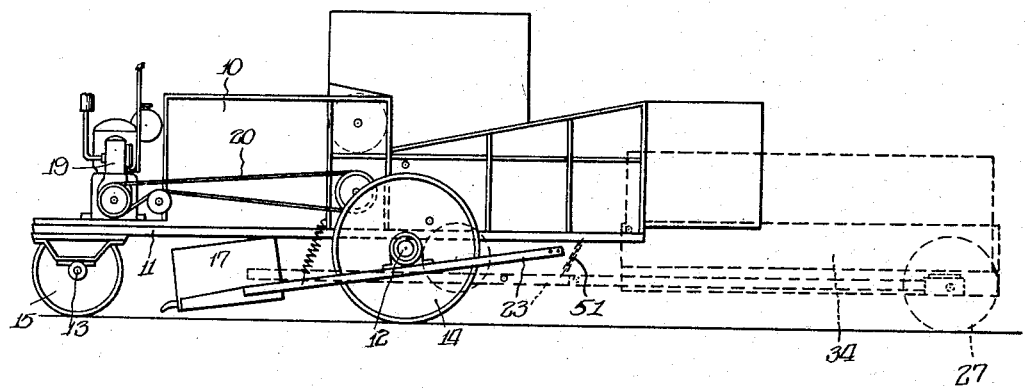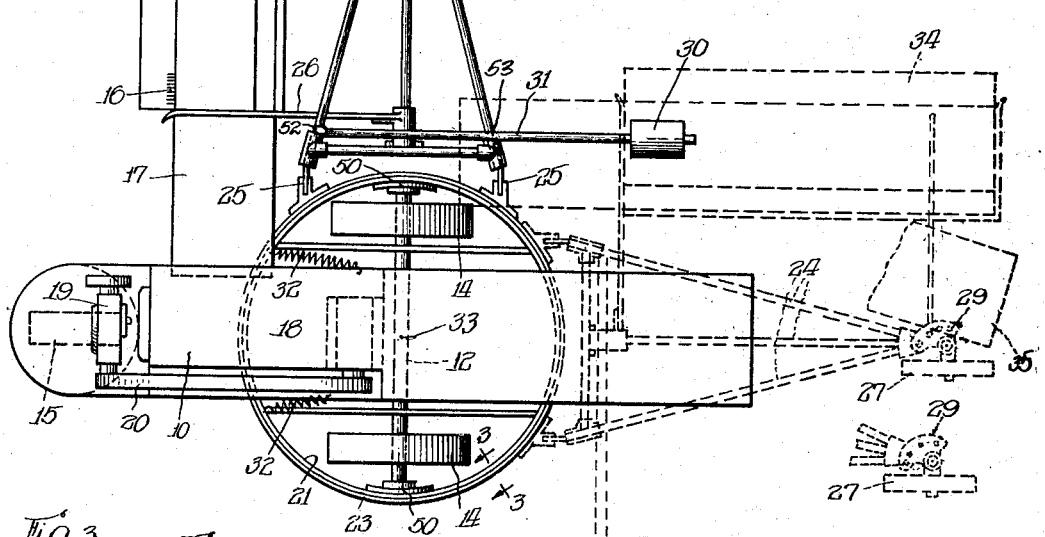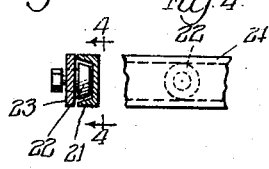

1,868,835

UNITED STATES PATENT OFFICE

FRANK N. C. KRANICH, OF WINNETKA, ILLINOIS

HARVESTING APPARATUS

Application filed August 6, 1927. Serial No. 211,056.

This invention pertains to vehicle gauge reducing apparatus, and more particularly to harvesting apparatus so constructed that parts of said apparatus may be moved to materially reduce the gauge thereof.

In machines such as harvester-threshers, combines or the like, it is usual to make certain parts thereof collapsible to more easily facilitate the transportation of said machine both on a carrier and under its own power. Many different schemes have been tried, such as pivoting parts on a horizontal, longitudinal pivot to allow a part to be raised to a vertical position, but this is not satisfactory as excessive strains are set up in the device and it is difficult to dispose the operating parts in non-obstructive positions. Where pivoting of a part is allowed horizontally, the gauge of the device is not reduced sufficiently and much trouble is encountered in balancing and providing auxiliary or changeable wheels for the revolved part.

It is therefore an object to provide a device, the parts of which may be readily moved to positions to materially alter the gauge of said device.

Another object is to provide means for reducing the gauge of combines or like machines, which means is so disposed and arranged as to prevent stress or strain of the parts of such machines.

A further object is to provide a threshing device whereby it is possible to materially reduce the gauge thereof, the device being so constructed that the parts thereof automatically assume working positions after the device is placed in working assembly.

A still further object is to provide a threshing device, parts of which are adjustably arranged so that the gauge of the device may be materially decreased but the movable parts of said device may still be supported in positions where no added strain is upon any parts of the device.

With these and various other objects in view, the invention consists of certain novel features of construction and operation as will be more fully described and particularly pointed out in the specification, drawing and claims appended hereto.

In the drawing, which illustrates an embodiment of the device and wherein like reference characters are used to designate like parts—

Figure 1 is a side elevation of a combine embodying the invention, the dotted lines representing the position of the header and associated parts in revolved, inoperative or changed position;

Figure 2 is a plan view of Figure 1, showing the position of the parts in operating position, changed positions of certain of the parts being represented by dotted lines;

Figure 3 is a section through the track or revolvable frame, taken substantially in the plane as indicated by the line 3—3 of Figure 2; and Figure 4 is an elevation of Figure 3, taken substantially in the plane as indicated by the line 4—4 of Figure 3.

A harvester-thresher or combine is shown as provided with a body 10 mounted on the frame 11, said frame being mounted on and carried by the axles 12 and 13 supported by wheels 14 and 15 respectively. A means for cutting grains or the like is provided on a platform or header 15 provided with any convenient cutting means, such as the sickle 16 so disposed as to deliver cut grains to an apron or elevator 17 communicating with the cylinder 18 and associated operating parts, said cylinder being conveniently operated by the engine 19 connected thereto by the belt 20. Axle 12 supports and holds in place a frame or track 21 of any convenient structure, such as a channel providing a track for a bearing 22 supporting track 23. Suitable struts or supporting members 24 are pivoted for vertical movement to brackets 25 on the track member 23, the track assembly being so supported on the axle 12 as to be capable of pivotal movement around said axle, as by means of brackets 50 secured to track member 21. The header 15 is secured to the struts 24 by supports 26 and the struts 24 are provided at their outer end with a header wheel 27. This wheel is mounted about and is adapted to swing around a vertical pivot 28, suitable fastening means 29, allowing selective movement around said pivot, being provided embodying a plate and pin connection to the struts 24.

Header 15 may be counterbalanced in any convenient manner, such as by the weight 30 carried by the support 31 fastened to the struts 24. A convenient means of mounting the counterweight may take the form of pivotally mounting the support 31 to the strut 24 farthest removed from the weight 30 as at 52, the support 31 extending across the top of and resting upon the near strut 24 as at 53, it being then possible to revolve or remove the counterweight to inoperative position. Springs 32 may also be provided which cooperate between the frame 11 and the track 21—23 and which may be used in conjunction with or in place of the counterweight 30. A chain or other flexible support 51 is disposed between the body 10 and the track 21, and is of such length that it will maintain the track in substantially horizontal position when the header is in revolved or inoperative position. It will readily be appreciated then that due to the arrangement shown, the header may be revolved to such a position that it will not interfere with the transportation of the combine. As will be noticed, the header is mounted for practically universal movement and it will be seen that it may be revolved by means of its track support around a point 33 located approximately on the longitudinal center line of the body.

If then it is desired to reduce the gauge of the vehicle, the header of the combine may be revolved to the dotted position 34, as shown in Figure 2. In this position, the header wheel 27 may be revolved around the pivot 28, the plate 29 being secured in a proper position so that the axis of said wheel 27 will be parallel to the axis of the wheels 14. It may, however, be desired to reduce the width of the combine still further, in which case the header wheel and platform may be further revolved to assume the position 35, as indicated in Figure 2, the wheel 27 being within the width of the body, it being understood of course that this wheel is moved so that its axis is kept parallel to the axis of the wheels 14. It will be noticed too, as particularly shown in Figure 1, that when the header is revolved, the track 21—23 will assume a different position than its operating position; that is, it will be approximately horizontal.

It will be readily appreciated that by the arrangement shown, the gauge of the device can be materially reduced; that is, the gauge can be readily reduced to only that of the body and also the width of the vehicle may be reduced to substantially that of the width of the body.

It will of course be understood that I do not wish to be limited by the exact embodiment of the device shown as other and various modifications will occur to those skilled in the art.

I claim:

1. In a device of the character described, the combination of a wheeled operating machine carrying body, a movable track on said body, and wheeled operating means extending beyond said body and supported and revolvable on said track so that said means may be revolved to reduce the gauge of said device substantially to that of the body of said device.

2. In a device of the character described, the combination of a wheeled operating machine carrying body, a movable track on said body, wheeled operating means extending beyond said body and supported and revolvable on said track so that said means may be revolved to reduce the gauge of said device substantially to that of the body of said device, and means for counterbalancing said beforementioned means to permit adjustable operation thereof.

3. In a device of the character described, the combination of a wheeled operating machine carrying body, a movable track on said body, and wheeled operating means extending beyond said body and hingedly supported and revolvable on said track so that said means may be revolved to reduce the gauge of said device substantially to that of the body of said device.

4. In a device of the character described, the combination of a wheeled operating machine carrying body, a movable track on said body, wheeled operating means extending beyond said body and hingedly supported and revolvable on said track so that said means may be revolved to reduce the gauge of said device substantially to that of the body of said device, and means for counterbalancing said before-mentioned means to permit adjustable operation thereof.

5. In a device of the character described, the combination of a wheeled operating machine carrying body, a movable track on said body, wheeled operating means extending beyond said body and hingedly supported and revolvable on said track so that said means may be revolved to reduce the gauge of said device substantially to that of the body of said device, means whereby the supporting wheel of said operating means may be adjusted to correspond to the body wheels, and means for counterbalancing said before-mentioned means to permit adjustable operation thereof.

6. In a device of the character described, the combination of wheeled operating machine carrying body, a wheeled operating platform hinged to said body, said platform extending beyond said body and being pivoted to said body to be moved around a point intermediate the wheels of said body to thereby reduce the gauge of the device to substantially the gauge of the body.

7. In a combine, the combination of a wheeled body, a platform carried by and extending beyond the width of said body and mounted for universal movement thereon, and means whereby said platform may be moved around a point substantially on the longitudinal center line of said body to thereby reduce the gauge of said combine.

8. In a combine, the combination of a wheeled body, a platform carried by and extending beyond the width of said body and mounted for universal movement thereon, means whereby said platform may be moved around a point substantially on the longitudinal center line of said body to thereby reduce the gauge of said combine, and means for counterbalancing said platform to permit adjustable operation thereof.

9. In a combine, the combination of a body, operating structure extending outwardly from said body, and means whereby said structure may be moved about a point within said body as a center to a position to reduce the gauge of said combine to substantially that of said body.

10. In a combine, the combination of a wheeled body, operating structure extending outwardly from said body, and means whereby said structure is pivoted to said body for movement around a point within the body as a center to a position to decrease the operating width of said combine.

11. In a combine, the combination of a wheeled body, operating structure extending outwardly from said body and mounted upon means carried by said body whereby said structure may be moved around a point within said body as a center to a position to reduce the width of said combine.

12. In a combine, the combination of a wheeled body, wheeled operating structure extending outwardly from said body and mounted upon means carried by said body whereby said structure may be moved horizontally around a point within said body as a center to a position to reduce the width of said combine and to be trailed by said body.

13. In a combine, the combination of a wheeled body having operating mechanism mounted thereon, structure extending beyond said body adapted to operatively cooperate with said operating mechanism, wheeled supporting means for said structure pivoted to said body whereby said structure may be moved around a point within said body as a center to a position to reduce the width of said combine.

14. In a combine, the combination of a wheeled body having operating mechanism mounted thereon, structure extending beyond said body adapted to operatively cooperate with said operating mechanism, wheeled supporting means for said structure mounted on a circular track mounted on said body whereby said structure may be moved around a point within said track to a position to reduce the width of said combine.

15. In a combine, the combination of a wheeled body having operating mechanism mounted thereon, structure extending beyond said body adapted to operatively cooperate with said operating mechanism, wheeled supporting means for said structure mounted on means on said body permitting substantial universal movement of said structure with respect to said body about a plurality of axes, said means on said body permitting further movement of structure whereby said structure may be moved around said body to a position to reduce the width of said combine.

16. In a combine, the combination of a wheeled body having operating mechanism mounted thereon, structure extending beyond said body adapted to operatively cooperate with said operating mechanism, wheeled supporting means for said structure mounted on means on said body permitting substantial universal movement of said structure with respect to said body about a plurality of axes, said means on said body permitting further movement of structure whereby said structure may be moved horizontally around said body to a position to reduce the width of said combine and to be trailed by said body.

17. In a combine, the combination of a body, supporting wheels therefor, operating structure extending outwardly of said body, and means whereby the major portion of said structure may be moved about a point within said body to reduce the gauge of the combine to within the gauge of the wheels.

18. In a combine, the combination of a body, wheels therefor, operating structure extending outwardly from one side of said body, said structure having a supporting wheel adjacent one end thereof, and means whereby the wheel of said structure may be selectively moved within the gauge of said wheels or outside the gauge of said wheels on the side remote from the first named side of said body to thereby move a substantial portion of said structure within the gauge of said body.

19. In a combine, the combination of a body, wheels therefor, operating structure extending outwardly from one side of said body, means for supporting said structure, said structure having a supporting wheel adjacent one end thereof, said means being pivotally mounted on said body and movable in a plurality of directions whereby the wheel of said structure may be selectively moved within the gauge of said wheels to thereby move a substantial portion of said structure within the gauge of said body.

20. In a combine, the combination of a body, wheels therefor, operating structure extending outwardly from one side of said body, said structure having a supporting wheel adjacent one end thereof, and means whereby the wheel of said structure may be selectively moved outside the gauge of said wheels on the side remote from the first named side of said body to thereby move a substantial portion of said structure within the gauge of said body.

21. In a combine, the combination of a body, wheels therefor, operating structure extending outwardly from one side of said body, said structure having a supporting wheel adjacent one end thereof, and means extending outside the gauge of said wheels for rotatably connecting said structure to said body and defining the gauge of said body whereby the wheel of said structure may be selectively moved within the gauge of said wheels to thereby move a substantial portion of said structure within the gauge of said body.

22. In a combine, the combination of a body, wheels therefor, operating structure extending outwardly from one side of said body, said structure having a supporting wheel adjacent one end thereof, and means extending outside the gauge of said wheels for rotatably connecting said structure to said body and defining the gauge of said body whereby the wheel of said structure may be selectively moved about a point within the gauge of said body to a position within the gauge of said wheels to thereby move a substantial portion of said structure within the gauge of said body.

23. In a combine, the combination of a body, wheels therefor, operating structure extending outwardly from one side of said body, said structure having a supporting wheel adjacent one end thereof, and means extending outside the gauge of said wheels for rotatably connecting said structure to said body and defining the gauge of said body whereby the wheel of said structure may be selectively moved about a point within the gauge of said wheels to a position outside the gauge of said wheels on the side remote from the first named side of said body to thereby move a substantial portion of said structure within the gauge of said body.

24. In a combine, the combination of a body, wheels therefor, operating structure extending outwardly from one side of said body, said structure having a supporting wheel adjacent one end thereof, and means supported on said wheels and extending outside the gauge of said wheels for rotatably connecting said structure to said body and defining the gauge of said body whereby the wheel of said structure may be selectively moved within the gauge of said wheels to thereby move a substantial portion of said structure within the gauge of said body.

25. In a combine, the combination of a body, wheels therefor, operating structure extending outwardly from one side of said body, said structure having a supporting wheel adjacent one end thereof, and means supported on said wheels and extending outside the gauge of said wheels for rotatably connecting said structure to said body and defining the gauge of said body whereby the wheel of said structure may be selectively moved about a point within the gauge of said wheels to a position outside the gauge of said wheels on the side remote from the first named side of said body to thereby move a substantial portion of said structure within the gauge of said body.

26. In a combine, the combination of a body, supporting wheels therefor, operating structure extending outwardly from said body, and means for moving said structure about a point within said body whereby the gauge of the combine is reduced and the major portion of said structure is within the gauge of the wheels thereof.

27. In a combine, the combination of a wheeled body, wheel operating structure operatively associated with said body, and means whereby said structure may be moved around a point within said body as a center to reduce the gauge of said combine.

28. In a combine, the combination of a wheeled body, wheel operating structure extending outwardly therefrom, and means for movably supporting said structure for rotation about a point within said body as a center whereby said body may be moved about said point to so position said structure as to reduce the gauge of said combine.

Signed at Chicago, Illinois, this 4th day of August, 1927.

FRANK N. G. KRANICH.

CERTIFICATE OF CORRECTION.

Patent No. 1,868,835.                                July 26, 1932.

FRANK N. G. KRANICH.

It is hereby certified that error appears in the printed specification of the above numbered patent requiring correction as follows: Page 3, strike out claim 17, between lines 99 to 105; and insert the following as claim 17:

17. In a machine of the class described, a thresher, a harvester, a turntable associated with the thresher, and a support for the harvester flexibly connected to the turntable to move vertically for following irregularities of the ground and also whereby when the said turntable is rotated the harvester will be positioned at the rear of the thresher to reduce the width of the combined thresher and harvester.;

and that the said Letters Patent should be read with this correction therein that the same may conform to the record of the case in the Patent Office.

Signed and sealed this 1st day of November, A. D. 1932.

M. J. Moore, (Seal)                                         Acting Commissioner of Patents.